(12) United States Patent
Jung et al.

(10) Patent No.: US 12,176,553 B2
(45) Date of Patent: Dec. 24, 2024

(54) SEALING DEVICE AND METHOD FOR SECONDARY BATTERY

(71) Applicant: LG Energy Solution, Ltd., Seoul (KR)

(72) Inventors: Do Hwa Jung, Daejeon (KR); Chan Ki Park, Daejeon (KR); Do Yeon Kwon, Daejeon (KR); Sung Hwan Kim, Deajeon (KR); Ho Young Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 665 days.

(21) Appl. No.: 17/429,152

(22) PCT Filed: Mar. 27, 2020

(86) PCT No.: PCT/KR2020/004265
§ 371 (c)(1),
(2) Date: Aug. 6, 2021

(87) PCT Pub. No.: WO2020/197341
PCT Pub. Date: Oct. 1, 2020

(65) Prior Publication Data
US 2022/0166096 A1    May 26, 2022

(30) Foreign Application Priority Data
Mar. 28, 2019  (KR) .................. 10-2019-0036137

(51) Int. Cl.
*H01M 50/186*  (2021.01)
*H01M 50/105*  (2021.01)
(Continued)

(52) U.S. Cl.
CPC ....... *H01M 50/186* (2021.01); *H01M 50/105* (2021.01); *H01M 50/178* (2021.01); *H01M 50/533* (2021.01)

(58) Field of Classification Search
CPC . H01M 50/186; H01M 10/0404; H01M 10/04
See application file for complete search history.

(56) References Cited

U.S. PATENT DOCUMENTS

2002/0157242 A1   10/2002  Fukuda et al.
2005/0084749 A1    4/2005  Hwang et al.
(Continued)

FOREIGN PATENT DOCUMENTS

CN       1610166 A     4/2005
CN     107408720 A    11/2017
(Continued)

OTHER PUBLICATIONS

Machine translation of KR 20150137206, Dec. 9, 2015 (Year: 2015).*

(Continued)

*Primary Examiner* — James M Erwin
*Assistant Examiner* — Zackary Richard Cochenour
(74) *Attorney, Agent, or Firm* — Lerner David LLP

(57) ABSTRACT

A sealing device for a secondary battery, the sealing device configured to seal a sealing part of a pouch through which an electrode lead extends according to the present invention comprises: a lower sealing tool configured to receive the sealing part of the pouch seated thereon; and an upper sealing tool configured to press and seal the sealing part of the pouch, wherein the lower sealing tool comprises: a lower fixed block configured to receive the sealing part of the pouch seated on a top surface thereof; and one or more lower detachable blocks detachably coupled to the lower fixed block and configured to support a portion of the sealing part through which the electrode lead does not extend.

12 Claims, 12 Drawing Sheets

(51) Int. Cl.
    *H01M 50/178*    (2021.01)
    *H01M 50/533*    (2021.01)

(56) References Cited

U.S. PATENT DOCUMENTS

| | | |
|---|---|---|
| 2011/0117394 A1 | 5/2011 | Hwang et al. |
| 2012/0079711 A1 | 4/2012 | Stancu et al. |
| 2012/0291512 A1 | 11/2012 | Kang et al. |
| 2013/0052521 A1 | 2/2013 | Kim |
| 2013/0260211 A1 | 10/2013 | Min et al. |
| 2015/0093603 A1 | 4/2015 | Won et al. |
| 2016/0049682 A1 | 2/2016 | Won et al. |
| 2018/0047950 A1 | 2/2018 | Lim et al. |
| 2018/0062131 A1 | 3/2018 | Cho et al. |
| 2018/0102521 A1 | 4/2018 | Cho et al. |
| 2018/0261807 A1 | 9/2018 | Lim |

FOREIGN PATENT DOCUMENTS

| | | | |
|---|---|---|---|
| CN | 107548524 A | 1/2018 | |
| CN | 108140759 A | 6/2018 | |
| JP | 2000173562 A | 6/2000 | |
| JP | 2004303563 A | 10/2004 | |
| JP | 2005116228 A | 4/2005 | |
| JP | 2005216623 A | 8/2005 | |
| JP | 2006134604 A | 5/2006 | |
| JP | 2006147230 A | 6/2006 | |
| JP | 2010244725 A | 10/2010 | |
| JP | 3168335 U | 6/2011 | |
| JP | 2012199248 A | 10/2012 | |
| KR | 19990043932 A | 6/1999 | |
| KR | 20010110686 A | 12/2001 | |
| KR | 20030044257 A | 6/2003 | |
| KR | 20110075724 A | 7/2011 | |
| KR | 20120038695 A | 4/2012 | |
| KR | 20120060700 A | 6/2012 | |
| KR | 20140036438 A | 3/2014 | |
| KR | 20150137206 * | 5/2014 | ............ G06F 1/163 |
| KR | 20150025687 A | 3/2015 | |
| KR | 20150031857 A | 3/2015 | |
| KR | 20150050217 A | 5/2015 | |
| KR | 20150110122 A | 10/2015 | |
| KR | 20160096417 A | 8/2016 | |
| KR | 20160118931 A | 10/2016 | |
| KR | 20160133041 A | 11/2016 | |
| KR | 101816333 B1 * | 1/2018 | ............ H01M 50/10 |
| KR | 20180028714 A * | 3/2018 | ........ H01M 10/0413 |
| KR | 20180093598 A | 8/2018 | |
| WO | 2016200147 A1 | 12/2016 | |

OTHER PUBLICATIONS

Machine translation of KR10181633B1, Jan. 8, 2018 (Year: 2018).*
Machine translation of Kr 20180028714A, Mar. 19, 2018 (Year: 2018).*
Search Report dated Dec. 27, 2022 from the Office Action for Chinese Application No. 202080008864.1 issued Jan. 5, 2023, pp. 1-4. [See p. 2, categorizing the cited references].
Extended European Search Report including Written Opinion for Application No. 20779379.5 dated Feb. 2, 2022, pp. 1-6.
International Search Report for PCT/KR2020/004265 dated Jul. 8, 2020 (2 pgs.).

\* cited by examiner

SEALING DEVICE AND METHOD FOR SECONDARY BATTERY

CROSS-REFERENCE TO RELATED APPLICATION

This application is a national phase entry under 35 U.S.C. § 371 of International Application No. PCT/KR2020/004265, filed on Mar. 27, 2020, published in Korean, which claims priority from Korean Patent Application No. 10-2019-0036137, filed on Mar. 28, 2019, the contents of which are hereby incorporated herein by reference in their entireties.

TECHNICAL FIELD

The present invention relates to a sealing device and method for a secondary battery, and more particularly, to a sealing device having an assemblable block structure and a sealing method.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery comprises an electrode assembly, in which electrodes and separators are alternately stacked, and a pouch accommodating the electrode assembly. Also, a method for manufacturing the secondary battery comprises an electrode manufacturing process of manufacturing an electrode, an electrode assembly manufacturing process of alternately stacking electrodes and separators to manufacture an electrode assembly, an electrode lead bonding process of bonding an electrode lead to the electrode assembly, and a pouch sealing process of accommodating the electrode assembly in a pouch in a state in which a front end of the electrode lead is pulled out to the outside to seal an edge surface of the case.

Here, in the pouch sealing process, the edge surface of the pouch is sealed using a sealing device comprising an upper tool and a lower tool.

However, the sealing device may stably seal the edge surface of the pouch which does not have the electrode lead, but the sealing the edge surface of the pouch having the electrode lead is failed due to the pull-out of the electrode lead.

In particular, the capacity of the secondary battery, the design of the secondary battery, the material of the electrode lead, and the width, thickness, and position of the electrode lead depending on the sales company may vary. Accordingly, there is a problem that a new sealing device has to be manufactured whenever the width, thickness, and the position of the electrode lead vary.

DISCLOSURE OF THE INVENTION

Technical Problem

The present invention is invented to solve the above problems, and an object of the present invention is to provide a sealing device having a block structure that is capable of being assembled according to a width, thickness, and position of an electrode lead and thus is used compatibly regardless of the width, thickness, and position of the electrode lead, thereby increasing in sealing force of a sealing part of a pouch at which the electrode lead is disposed.

Technical Solution

The present invention for achieving the above objects provides a sealing device for a secondary battery, which seals a sealing part of a pouch from which an electrode lead is pulled out, the sealing device comprising: a lower sealing tool on which the sealing part of the pouch from which the electrode lead is pulled out is seated; and an upper sealing tool configured to press and seal the sealing part of the pouch from which the electrode lead seated on the lower sealing tool is pulled out, wherein the lower sealing tool comprises: a lower fixed block on which the sealing part of the pouch from which the electrode lead is pulled out is seated on a top surface thereof; and one or more lower detachable blocks detachably coupled to the lower fixed block and configured to support a sealing surface, on which the electrode lead is not disposed, of the sealing part of the pouch from which the electrode lead is pulled out.

The lower fixed block may be provided with a plurality of first lower coupling parts on the top surface thereof in a longitudinal direction, and each of the lower detachable blocks may be provided with a second lower coupling part detachably coupled to the first lower coupling part corresponding to the sealing surface, on which the electrode lead is not disposed, among the plurality of first lower coupling parts.

The first lower coupling part may be provided as a coupling groove, and the second lower coupling part may be provided as a coupling protrusion detachably coupled to the coupling groove.

Magnets may be provided on the first lower coupling part and the second lower coupling part so as to be attached to each other, respectively.

The lower sealing tool may further comprise a fixing piece configured to fix each of the lower detachable blocks coupled to the lower fixed block.

Both ends of the fixing piece may be respectively supported on the lower fixed block and the lower detachable block, which correspond to each other, to fix the lower fixed block and the lower detachable block to each other.

A fixing protrusion rotatably coupled to the lower fixed block may be provided on one side of the fixing piece, and the fixing piece may be rotatable to a position at which the lower detachable block is supported or a position at which the lower detachable block is not supported with respect to the fixing protrusion.

The upper sealing tool may comprise: an upper fixed block configured to press the sealing part of the pouch, from which the electrode lead is pulled out, on a bottom surface thereof; and one or more upper detachable blocks detachably coupled to the upper fixed block and configured to press the sealing surface, on which the electrode lead is not provided, of the sealing part of the pouch from which the electrode lead is pulled out.

The upper fixed block may be provided with a plurality of first upper coupling parts on a bottom surface thereof in a longitudinal direction, and each of the upper detachable blocks may be provided with a second upper coupling part detachably coupled to the first upper coupling part corresponding to the sealing surface, on which the electrode lead is not disposed, among the plurality of first upper coupling parts.

The first upper coupling part may be provided as a coupling groove, and the second upper coupling part may be provided as a coupling protrusion detachably coupled to the coupling groove.

The lower sealing tool may further comprise a lower extension block coupled to an end of the lower fixed block to increase in length of the lower fixed block, and the upper sealing tool may further comprise an upper extension block coupled to an end of the upper fixed block to increase in length of the upper fixed block.

A sealing method for a secondary battery according to the present invention comprises: a lower sealing tool preparation step (S10) comprising a lower fixed block preparation process of preparing a lower fixed block having a length corresponding to that of a sealing part of a pouch, from which an electrode lead is pulled out, and a lower detachable block preparation process of coupling one or more lower detachable blocks to a top surface of the lower fixed block, which corresponds to a sealing surface, on which the electrode lead is not provided, of the sealing part of the pouch from which the electrode lead is pulled out; an upper sealing tool preparation step (S20) of locating the upper sealing tool on an upper portion of the lower sealing tool; a sealing part seating step (S30) of seating the sealing part of the pouch, from which the electrode lead is pulled out, on a top surface of the lower sealing tool, wherein the sealing surface, on which the electrode lead is not provided, is seated to be supported on the lower detachable blocks; and a sealing part sealing step (S40) of allowing the upper sealing tool to descend toward the lower sealing tool to press and seal the sealing part of the pouch from which the electrode lead seated on the lower sealing tool is pulled out, wherein the sealing surface, on which the electrode lead is not provided, is sealed while being pressed by the lower detachable blocks and the upper sealing tool.

The lower sealing tool preparation step (S10) may further comprise a lower extension block coupling process of coupling a lower extension block to both ends of the lower fixed block to increase in length of the lower fixed block when the lower fixed block has a length less than that of the sealing part of the pouch from which the electrode lead is pulled out.

The lower sealing tool preparation step (S10) may further comprise a fixing piece fixing process of fixing the lower fixed block and each of the lower detachable blocks to each other by using a fixing piece after the lower fixed block and the lower detachable block are coupled to each other.

The upper sealing tool preparation step (S20) may comprise an upper fixed block preparation process of preparing an upper fixed block having a length corresponding to that of the sealing part of the pouch, from which the electrode lead is pulled out, and an upper detachable block preparation process of coupling one or more upper detachable blocks to a bottom surface of the upper fixed block, which corresponds to the sealing surface, on which the electrode lead is not provided, of the sealing part of the pouch from which the electrode lead is pulled out.

Advantageous Effects

The sealing device for the secondary battery according to the present invention may comprise the lower sealing tool and the upper sealing tool. The lower sealing tool may comprise the lower fixed block and the lower detachable block, which are assembled in the block form. Therefore, the lower sealing tool may be assembled to match the position of the sealing part of the pouch at which the electrode lead is disposed. That is, the lower fixed block and the lower detachable block may be assembled according to the shape of the sealing part of the pouch at which the electrode lead is disposed and thus be used compatibly regardless of the width, thickness, and position of the electrode lead, thereby improving the sealing force, in particularly, reducing the costs and preventing the possibility of the mold error from occurring.

In addition, in the sealing device for the secondary battery according to the present invention, the lower fixed block and the lower detachable block may be provided with the first and second lower coupling parts, which are coupled to each other, respectively. Thus, the coupling between the lower fixed block and the lower detachable block may be improved.

In addition, in the sealing device for the secondary battery according to the present invention, the lower fixed block and the lower detachable block may be provided with the magnets so as to be attached to each other, respectively. Thus, the coupling between the lower fixed block and the lower detachable block may be improved, and particularly, the shaking may be prevented.

In addition, in the sealing device for the secondary battery according to the present invention, the lower fixed block and the lower detachable block may be fixed by the fixing piece. Thus, the fixing between the lower fixed block and the lower detachable block may be improved, and particularly, the shaking may be prevented.

In addition, in the secondary battery sealing device of the present invention, the upper sealing tool may comprise the upper fixed block and the upper detachable block, which are assembled in the block form. Therefore, the upper sealing tool may be assembled to match the position of the sealing part of the pouch at which the electrode lead is disposed.

MODE FOR CARRYING OUT THE INVENTION

Figure 1:
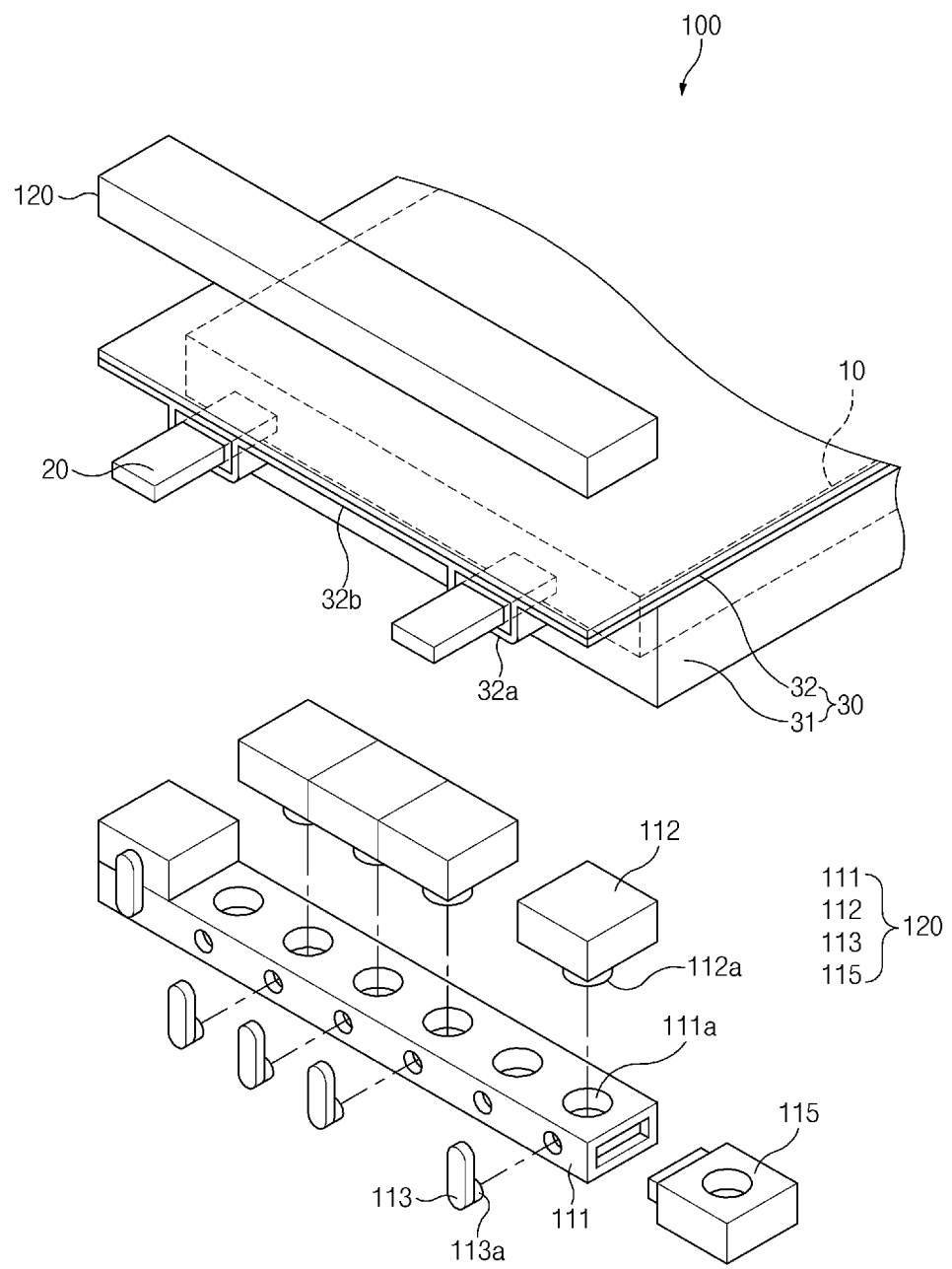
FIG. 1 is an exploded perspective view of a sealing device for a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to the Present Invention]

Referring to FIG. 1, a secondary battery according to the present invention comprises an electrode assembly 10, an electrode lead 20 coupled to the electrode assembly 10, and a pouch 30 accommodating the electrode assembly 10 in a state in which a front end of the electrode lead 20 is pulled out to the outside. The pouch 30 comprises an accommodation part 31 accommodating the electrode assembly 10 and sealing parts 32 disposed along an edge surface of the accommodation part 31 to seal the accommodation part 31. Here, the electrode lead 20 is pulled out to the outside through one sealing part 32 of the sealing parts 32 disposed on the edge surface of the accommodation part 31.

The sealing part 32 of the pouch 30 from which the electrode lead 20 is pulled out comprises a lower protrusion surface 32a convexly protruding by the electrode lead 20 and a lower non-protrusion surface 32b on which the electrode lead 20 is not disposed. The sealing part 32 comprising the lower protrusion surface 32a and the lower non-protrusion surface 32b are sealed through the sealing device for the secondary battery according to the present invention.

Particularly, the electrode lead 20 varies in width, thickness, and position according to capacity and a material of the electrode assembly, the sales company, and a design of the secondary battery. As a result, the sealing device 100 for the secondary battery according to the present invention may have a block structure that is assemblable according to the width, thickness, and position of the electrode lead 20. Therefore, the secondary battery having various electrode leads 20 may be sealed without providing a new sealing device to improve compatibility and reduce costs.

Hereinafter, the sealing device for the secondary battery according to an embodiment of the present invention will be described with reference to the accompanying drawings.

[Sealing Device for Secondary Battery According to First Embodiment of the Present Invention]

As illustrated in FIGS. 1 to 6, a sealing device 100 for the secondary battery according to a first embodiment of the present invention is configured to seal a sealing part of a pouch at which an electrode lead is disposed and comprises a lower sealing tool 110 on which the sealing part 32 of the pouch 30, at which the electrode lead 20 is disposed, is seated and an upper sealing tool 120 pressing and sealing the sealing part 32 of the pouch 30 at which the electrode lead 20 seated on the lower sealing tool 110 is disposed.

Lower Sealing Tool

Figure 2:
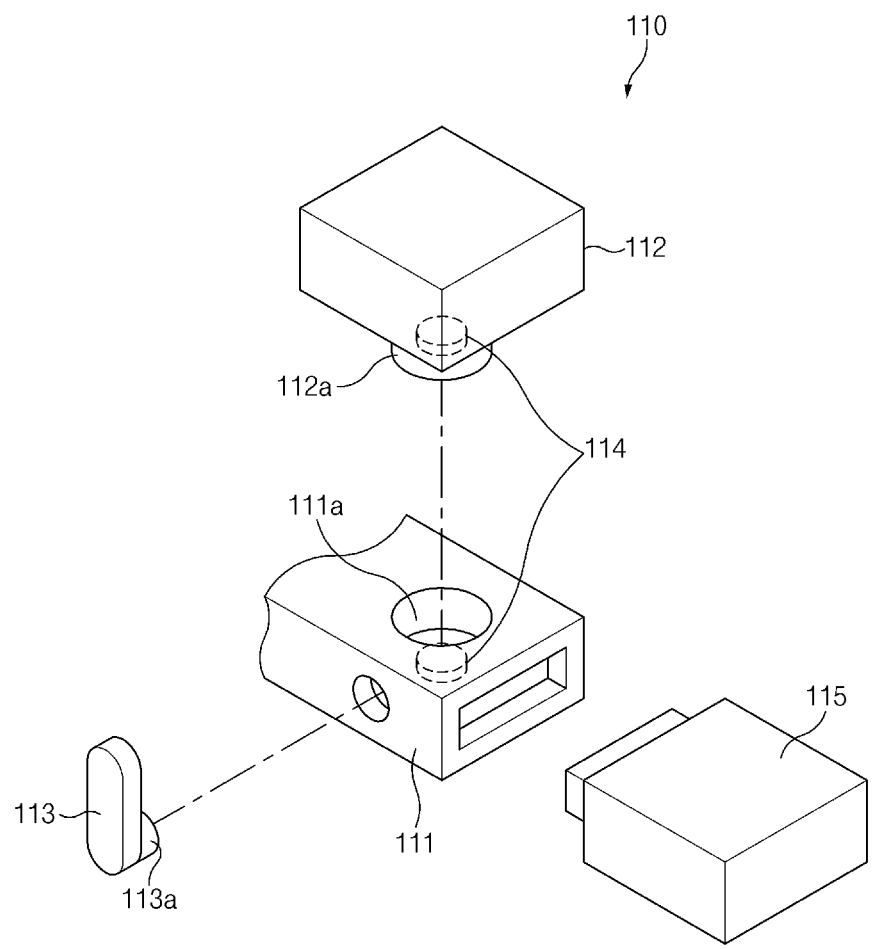
FIG. 2 is an exploded perspective view illustrating a lower sealing tool of the sealing device for the secondary battery according to the first embodiment of the present invention.
Figure 3:
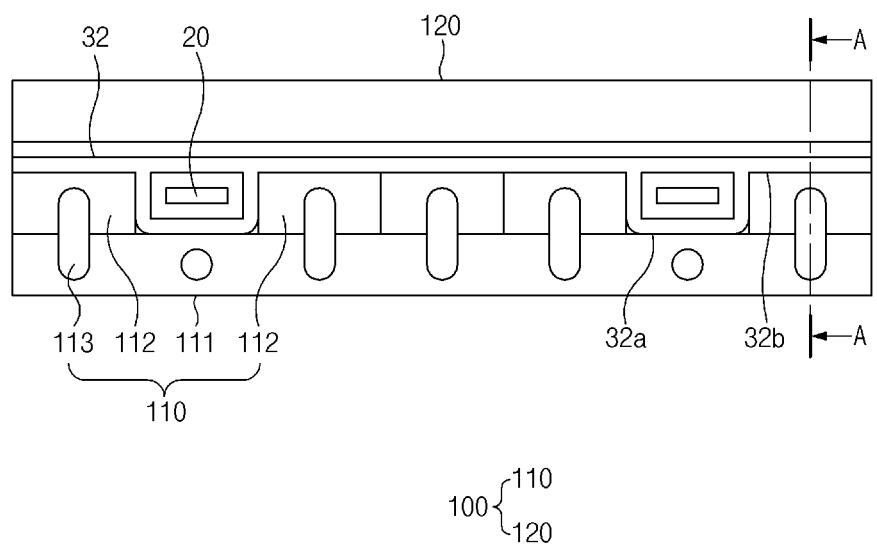
FIG. 3 is a front view of FIG. 1.

Referring to FIGS. 1 to 3, the lower sealing tool 110 has a structure that uniformly supports an entire surface of the sealing part of the pouch at which the electrode lead is disposed in the state in which the sealing part of the pouch, at which the electrode lead is disposed, is seated on the lower sealing tool 110. That is, the lower sealing tool 110 comprises a lower fixed block 111 on which the sealing part of the pouch 30, at which the electrode lead 20 is disposed, is seated on a top surface thereof and one or more lower detachable blocks 112 detachably coupled to the top surface of the lower fixed block 111 and supporting a non-protrusion surface 32b that is a sealing surface, on which the electrode lead 20 is not disposed, of the sealing part 32 of the pouch 30 at which the electrode lead 20 is disposed.

The lower fixed block 111 has a rectangular plate block shape, and the sealing part 32 of the pouch 30 at which the electrode lead 20 is disposed is seated on the top surface of the lower fixed block 111. Here, in the sealing part 32, only a protrusion surface 32a of the protrusion surface 32 and the non-protrusion surface 32b is supported on the lower fixed block 111, and the non-protrusion surface 32b is disposed to be spaced apart from the lower fixed block 111.

The lower detachable block 112 has a rectangular piece block shape and is detachably coupled to the top surface of the lower fixed block 111 corresponding to the non-protrusion surface 32b to support the non-protrusion surface 32b spaced apart from the lower fixed block 111.

The lower sealing tool 110 having the above-described configuration may adjust a position of the lower detachable block 112 that is detachably coupled to the lower fixed block 111. Particularly, the lower fixed block 111 and the upper fixed block 112 may be assembled or disassembled like a LEGO block. As a result, use convenience and compatibility may be improved. Therefore, the entire sealing part 32 of the pouch 30 may be stably uniformly supported regardless of the width, thickness, and position of the electrode lead 20.

Figure 4:
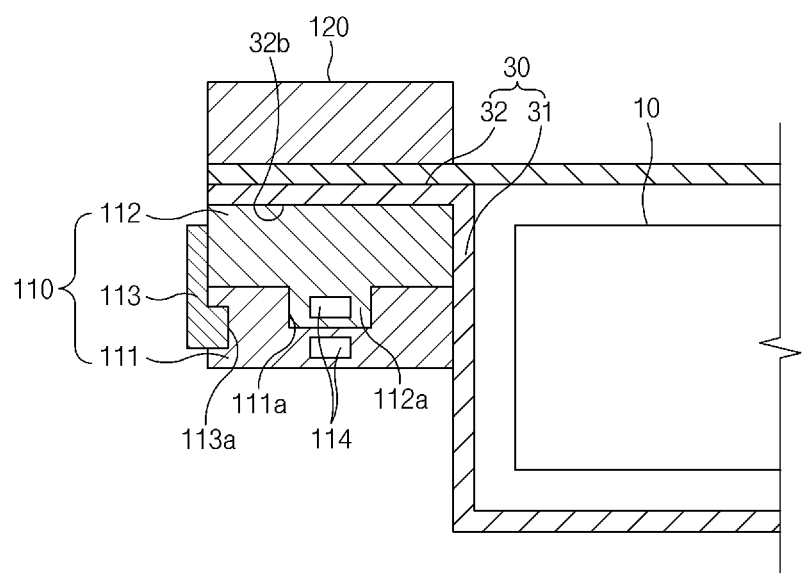
FIG. 4 is a cross-sectional view taken along line A-A of FIG. 3.

Referring to FIG. 4, in the lower sealing tool 110, the lower fixed block 111 and the lower detachable block 112 have a structure for increasing in coupling force. For example, the lower fixed block 111 is provided with a plurality of first lower coupling parts 111a on the top surface thereof in a longitudinal direction, and the lower detachable block 112 is provided with a second lower coupling part 112a detachably coupled to the first lower coupling part 111a, which corresponds to the lower non-protrusion surface 32b of the sealing part 32, on which the electrode lead 20 is not disposed, among the plurality of first lower coupling parts 111a. Thus, coupling force between the lower fixed block 111 and the lower detachable block 112 may increase through the coupling of the first and second lower coupling parts 111a and 112a.

Here, the first lower coupling part 111a may be provided as a coupling groove, and the second lower coupling part 112a may be provided as a coupling protrusion that is detachably coupled to the coupling groove. That is, the lower fixed block 111 and the lower detachable block 112 are coupled to each other through the coupling groove and the coupling protrusion. Thus, the lower fixed block 111 and the lower detachable block 112 may be easily assembled or disassembled.

Each of the coupling groove and the coupling protrusion has a circular shape. Thus, the coupling groove and the coupling protrusion may be more easily coupled to each other. However, each of the coupling groove and the coupling protrusion may have an oval and polygonal shape to prevent the coupling force between the lower fixed block 111 and the lower detachable block 112 from being reduced and prevent the lower fixed block 111 and the lower detachable block 112 from rotating. Particularly, each of the coupling groove and the coupling protrusion may have a triangular shape and a straight line to suggest a coupling direction.

Figure 6:
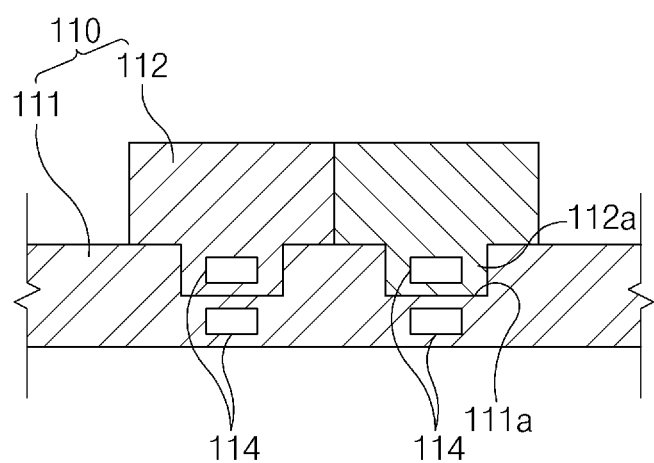
FIG. 6 is a cross-sectional view illustrating a magnet of the sealing device for the secondary battery according to the first embodiment of the present invention.

In the lower sealing tool 110, the coupling force between the lower fixed block 111 and the lower detachable block 112 may increase using magnetism as illustrated in FIG. 6. For example, magnets 114 may be provided to the first lower coupling part 111*a* of the lower fixed block 111 and the second lower coupling part 112*a* of the lower detachable block 112 so as to be attached to each other, respectively. The magnetic force due to the magnets 114 may increase in coupling force between the lower fixed block 111 and the lower detachable block 112 and may greatly prevent shaking from occurring by an external impact. Here, the magnets 114 may be embedded inside the first and second lower coupling parts 111*a* and 112*a*, respectively. Thus, the magnets 114 may be prevented from being separated or damaged by the first and second lower coupling parts 111*a* and 112*a*.

Figure 5:
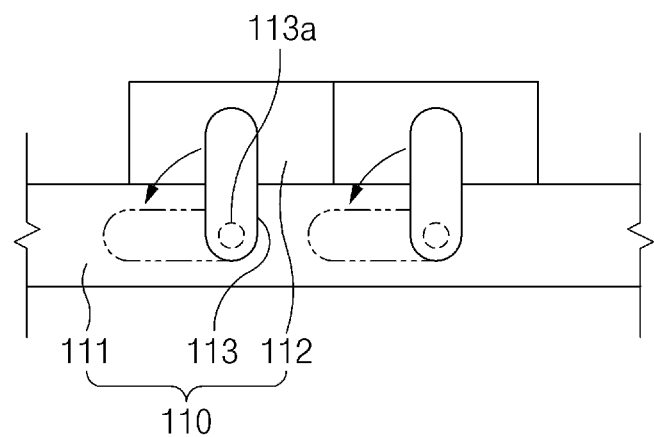
FIG. 5 is a front view illustrating a fixing piece of the sealing device for the secondary battery according to the first embodiment of the present invention.

Referring to FIG. 5, the lower sealing tool 110 further comprises a fixing piece 113 that fixes the lower detachable block 112 coupled to the lower fixed block 111. The fixing piece 113 fixes the lower detachable block 112 coupled to the lower fixed block 111 to prevent the lower detachable block 112 from rotating to a left or right side. For example, both ends of the fixing piece 113 are supported on the lower fixed block 111 and the lower detachable block 112, which correspond to each other, to fix the lower fixed block 111 and the lower detachable block 112, respectively. Thus, the lower detachable block 112 may be fixed without rotating to the left or right side when viewed in FIG. 1 by supporting force of the fixing piece 113.

Here, a fixing protrusion 113*a* rotatably coupled to the lower fixed block 111 is provided at one side of the fixing piece 113. That is, the fixing piece 113 may rotate to a position at which the other side of the fixing piece 113 supports the lower detachable block 112 with respect to the fixing protrusion 113*a* or to a position at which the lower detachable block 112 is not supported to improve use convenience and prevent the fixing piece 113 from being lost.

Here, an adhesive layer may be further provided between the fixing piece 113 and the lower fixed block 111, which are in close contact with each other, or the fixing piece 113 and the lower detachable block 112, which are in close contact with each other. Thus, the coupling force between the fixing piece 113 and the lower fixed block 111, which are in close contact with each other, or the fixing piece 113 and the lower detachable block 112, which are in close contact with each other, may increase.

The fixing piece 113 may be provided with an adhesive tape having adhesive force. The adhesive tape may be attached to each of the lower fixed block 111 and the lower detachable block 112, which correspond to each other, to increase in fixing force between the lower fixed block 111 and the lower detachable block 112.

Referring to FIG. 2, in the lower sealing tool 110, when the lower fixed block 111 has a length less than that of the sealing part 32 of the pouch 30, a lower extension block 115 may be coupled to the lower fixed block 111 so that the lower fixed block 111 increases in length to correspond to the sealing part 32 of the pouch 30. For example, the lower sealing tool 110 may couple the lower extension block 115 to an end of the lower fixed block 111 so that the length of the lower fixed block 111 increases by a length of the lower extension block 115.

Here, the lower fixed block 111 and the lower extending block 115 may be coupled to each other through the fixing groove and the fixing protrusion, which are respectively disposed on surfaces corresponding to each other.

Upper Sealing Tool

The upper sealing tool 120 is configured to press and seal the sealing part of the pouch at which the electrode lead is disposed. The upper sealing tool 120 is provided above the lower sealing tool 110 and disposed to be descendible toward the lower sealing tool 110. When descending, the electrode lead seated on the lower sealing tool 110 presses and seals the sealing part 32 of the pouch from which the electrode lead 20 is pulled out. Here, since the entire sealing part 32 (the protrusion surface and the non-protrusion surface) of the pouch 30 is supported on the lower sealing tool 110, pressing force of the upper sealing tool 120 may be uniformly applied to the entire sealing part 32 to uniformly seal the sealing part 32 of the pouch 30.

Thus, the sealing device 100 for the secondary battery according to the first embodiment of the present invention may comprise the lower sealing tool 110 that is assembled like a LEGO block. Therefore, the lower sealing tool may be assembled to match the position of the sealing part of the pouch at which the electrode lead is disposed. That is, the lower fixed block and the lower detachable block may be assembled according to the shape of the sealing part of the pouch at which the electrode lead is disposed to increase in sealing force therebetween. Particularly, the sealing device may be used compatibly regardless of the width, thickness, and position of the electrode lead, thereby improving the sealing force, in particularly, reducing costs and preventing possibility of a mold error from occurring.

Also, the sealing device for the secondary battery according to the first embodiment of the present invention may comprise the magnet to increase in coupling force between the lower fixed block and the lower detachable block, in particular, to prevent the shaking from occurring.

Also, the sealing device for the secondary battery according to the first embodiment of the present invention comprises the fixing piece to increase in fixing force between the lower fixed block and the lower detachable block, and particularly, prevent the shaking from occurring.

Hereinafter, in descriptions of another embodiment of the present invention, constituents having the same function as the above-mentioned embodiment have been given the same reference numeral in the drawings, and thus duplicated description will be omitted.

[Sealing Device for Secondary Battery According to Second Embodiment of the Present Invention]

As illustrated in FIGS. 1 to 9, a sealing device 100 for the secondary battery according to a second embodiment of the present invention comprises a lower sealing tool 110 on which a sealing part 32 of a pouch 30, at which an electrode lead 20 is disposed, is seated and an upper sealing tool 120 pressing and sealing the sealing part 32 of the pouch 30 at which the electrode lead 20 seated on the lower sealing tool 110 is disposed.

The lower sealing tool 110 has the same configuration as the lower sealing tool described in the first embodiment, and thus, duplicated description thereof will be omitted.

The upper sealing tool 120 has a structure that is capable of being assembled like a LEGO block.

That is, the sealing part 32 of the pouch 30 at which the electrode lead is disposed may be provided with an upper protrusion surface 32*c* in a direction of the upper sealing tool 120 (in an upward direction when viewed in FIG. 1) by the electrode lead. Thus, the upper sealing tool 120 may have a block structure that is assemblable to match the sealing part 32 of the pouch 30, on which the upper protrusion surface 32c is disposed.

The top surface of the sealing part 32 of the pouch comprises an upper protrusion surface 32c and an upper non-protrusion surface 32d.

Figure 7:
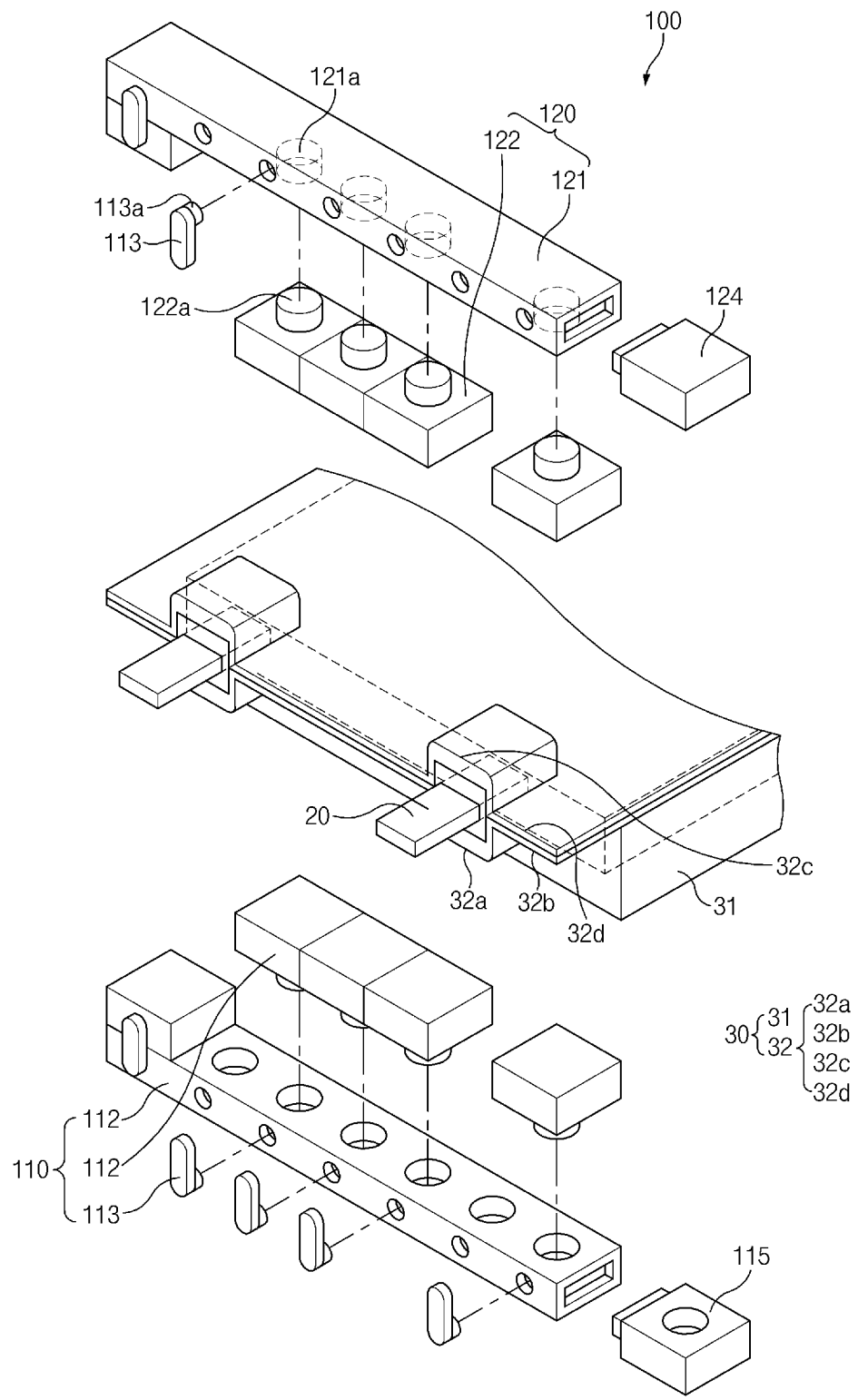
FIG. 7 is an exploded perspective view illustrating an upper sealing tool of the sealing device for the secondary battery according to the first embodiment of the present invention.
Figure 8:
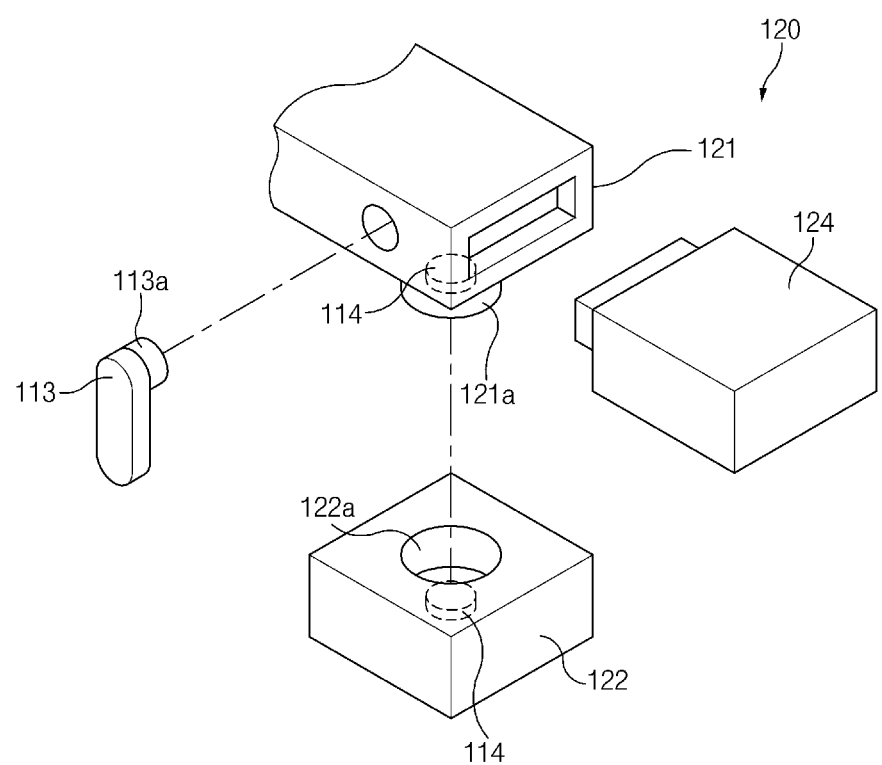
FIG. 8 is an enlarged perspective view of the upper sealing tool of FIG. 7.
Figure 9:
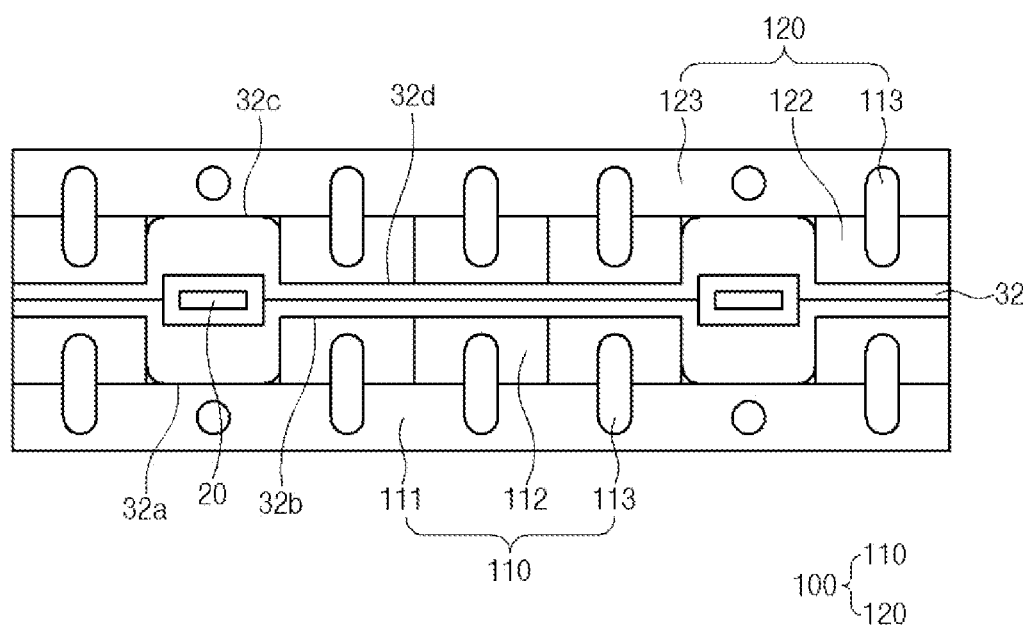
FIG. 9 is a front view of FIG. 7.

For example, referring to FIGS. 7 and 8, the upper sealing tool 120 may comprise an upper fixed block 121 that presses the sealing part 32 of the pouch 30, at which the electrode lead 20 is disposed, on a bottom surface thereof and one or more upper detachable blocks 122 detachably coupled to the upper fixed block 121 and pressing the upper non-protrusion surface 32d that is the sealing part, on which the electrode lead 20 is not provided, of the sealing part 32 of the pouch 30 at which the electrode lead 20 is disposed.

Thus, the upper sealing tool 120 comprises the upper fixed block 121 and one or more upper detachable blocks 122 that is detachably coupled to the upper fixed block 121 to simultaneously press the upper protrusion surface 32c and the upper non-protrusion surface 32d and thus uniformly press the entire top surface of the sealing part 30, thereby uniformly sealing the entire sealing part 30.

In the upper sealing tool 120, the upper fixed block 121 and the upper detachable block 122 have the structure for increasing in coupling force. For example, the upper fixed block 121 may be provided with a plurality of first upper coupling parts 121a on a bottom surface thereof in a longitudinal direction. The upper detachable block 122 may be provided with a second upper coupling part 122a detachably coupled to the first upper coupling part 121a, which corresponds to the upper non-protrusion surface 32d, among the plurality of first upper coupling parts 121a. Thus, the coupling force between the upper fixed block 121 and the upper detachable block 122 may increase through the first and second upper coupling parts 121a and 122a.

Here, the first upper coupling part 121a may be provided as a coupling groove, and the second upper coupling part 122a may be provided as a coupling protrusion that is detachably coupled to the coupling groove. Accordingly, the first and second upper coupling parts 121a and 122a may be easily coupled to each other.

The first upper coupling part 121a and the second upper coupling part 122a are provided with magnets 114 so as to be attached to each other. Thus, the coupling force between the upper fixed block 121 and the upper detachable block 122 may increase by the magnets 114.

The upper sealing tool 120 further comprises a fixing piece 113 that fixes the upper detachable block 122 coupled to the upper fixed block 121. The fixing piece 113 fixes the upper detachable block 122 coupled to the upper fixed block 121 to prevent the upper detachable block 122 from rotating to the left or right side.

In the upper sealing tool 120, when the upper fixed block 121 has a length less than that of the sealing part 32 of the pouch 30, an upper extension block 124 may be coupled to the upper fixed block 121 so that the upper fixed block 121 increases in length to correspond to the sealing part 32 of the pouch 30. For example, the upper sealing tool 120 may couple the upper extension block 124 to an end of the upper fixed block 121 so that the length of the upper fixed block 121 increases by a length of the upper extension block 124.

Thus, the upper sealing tool 120 comprises the upper fixed block 121 and the upper detachable block 122, which are assembled with each other like the LEGO block, to uniformly press the entire top surface of the sealing part 30 of the pouch at which the electrode lead is disposed, thereby uniformly sealing the entire sealing part 30 of the pouch 30.

In summary, the sealing device 100 for the secondary battery according to the second embodiment of the present invention may comprise the lower sealing tool 110 and the upper sealing tool 120, which are assembled with each other like the LEGO block. Therefore, the lower sealing tool and the upper sealing tool may be assembled with each other to match the position of the sealing part of the pouch, at which the electrode lead is disposed, thereby increasing in sealing force of the sealing part of the pouch. In particular, the sealing device may be used compatibly regardless of the width, thickness, and position of the electrode lead to reduce the costs and prevent the possibility of the mold error from occurring.

Hereinafter, a sealing method using the sealing device 100 for the secondary battery according to the second embodiment of the present invention will be described.

[Sealing Method for Secondary Battery According to Second Embodiment of the Present Invention]

Figure 10:
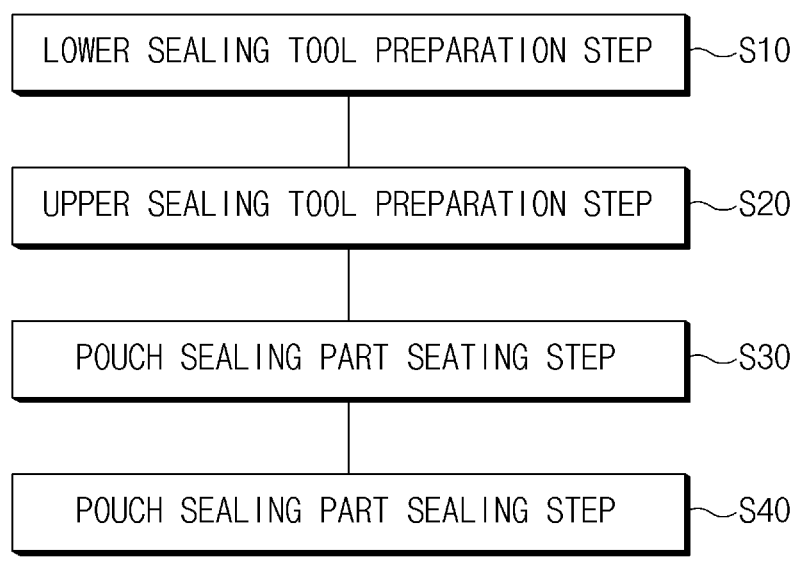
FIG. 10 is a flowchart illustrating a sealing method for a second battery according to a second embodiment of the present invention.

As illustrated in FIG. 10, a sealing method for a secondary battery according to a second embodiment of the present invention comprises a lower sealing tool preparation step (S10) of preparing a lower sealing tool 110, an upper sealing tool preparation step (S20) of preparing an upper sealing tool 120, a sealing part seating step (S30) of seating a sealing part 32 of a pouch 30, from which an electrode lead is pulled out, on a top surface of the lower sealing tool 110, and a sealing part sealing step (S40) of allowing the upper sealing tool 120 to descend toward the lower sealing tool 110 so as to press and seal the sealing part 32 of the pouch 30 at which the electrode lead seated on the lower sealing tool 110 is disposed.

Lower Sealing Tool Preparation Step

The lower sealing tool preparation step (S10) comprises a lower fixed block preparation process of preparing a lower fixed block 111 having a length corresponding to that of the sealing part 32 of the pouch, at which the electrode lead 20 is disposed, and a lower detachable block preparation process of coupling one or more lower detachable blocks 112 to a top surface of the lower fixed block 111, which corresponds to a lower non-protrusion surface 32b that is the sealing part, on which the electrode lead 20 is not provided, of the sealing part 32 of the pouch 30 at which the electrode lead 20 is disposed.

Here, in the lower detachable block preparation process, a second lower coupling part 112a formed on the lower detachable block 112 may be coupled to a first lower coupling part 111a formed on the lower fixed block 111 to increase in coupling force between the lower fixed block 111 and the lower detachable block 112.

The lower sealing tool preparation step (S10) further comprises a lower extension block coupling process of allowing the lower fixed block 111 to increase in length when the lower fixed block 111 has a length less than that of the sealing part 32 of the pouch 30 at which the electrode lead 20 is disposed.

In the lower extension block coupling process, a lower extension block 115 may be coupled to both ends of the lower fixed block 111 to increase in length of the lower fixed block 111, thereby preparing the lower fixed block 111 to correspond to the sealing part 32 of the pouch 30 at which the electrode lead 20 is disposed.

Here, the lower fixed block 111 and the lower extension block 115 may be coupled to each other through a fixed groove and a fixing protrusion, which are formed on surfaces corresponding to each other, to increase in coupling force between the lower fixed block 111 and the lower extension block 115.

The lower sealing tool preparation step (S10) further comprises a fixing piece fixing process of fixing the lower fixed block 111 and the lower detachable block 112 to each other without moving after the lower fixed block 111 and the lower detachable block 112 are coupled to each other.

That is, in the fixing piece fixing process, the lower fixed block 111 and the lower detachable block 112 are fixed to each other by using a fixing piece 113. Here, one side of the fixing piece 113 is fixed to the lower fixed block 111 by a fixing protrusion 113a, and thus, the fixing piece 113 rotates with respect to the fixing protrusion 113a. As a result, the other side of the fixing piece 113 may be disposed to be supported on the lower detachable block 112 or disposed so as not to be supported on the lower detachable block 112 to fix the lower fixed block 111 and the lower detachable block 112 without moving or release the fixing of the lower fixed block 111 and the lower detachable block 112.

Particularly, in the lower sealing tool preparation step (S10), the lower fixed block 111 and the lower detachable block 112 may be attached to each other by the magnets 114, which are provided on the surrounding surfaces of the lower fixed block 111 and the lower detachable block 112 to increase in coupling force between the lower fixed block 111 and the lower detachable block 112.

Upper Sealing Tool Preparation Step

In the upper sealing tool preparation step (S20), the upper sealing tool is disposed on the lower sealing tool.

When an upper protrusion surface 32c and an upper non-protrusion surface 32d are formed on the top surface of the sealing part 32 of the pouch 30 at which the electrode lead 20 is disposed, a process of assembling the upper sealing tool 120 may be performed to simultaneously press the upper protrusion surface 32c and the upper non-protrusion surface 32d.

The upper sealing tool preparation step (S20) comprises an upper fixed block preparation process of preparing an upper fixed block 121 having a length corresponding to that of the sealing part 32 of the pouch, at which the electrode lead 20 is disposed, and an upper detachable block preparation process of coupling one or more upper detachable blocks 122 to a bottom surface of the upper fixed block 121, which corresponds to the upper non-protrusion surface 32d that is the sealing part, on which the electrode lead 20 is not provided, of the sealing part 32 of the pouch 30 at which the electrode lead 20 is disposed. When the preparation is completed as described above, the assembled upper sealing tool is disposed on the lower sealing tool.

Here, in the upper detachable block preparation process, a second upper coupling part 122a formed on the upper detachable block 122 may be coupled to a first upper coupling part 121a formed on the upper fixed block 121 to increase in coupling force between the upper fixed block 121 and the upper detachable block 122.

The upper sealing tool preparation step (S10) further comprises an upper extension block coupling process of allowing the upper fixed block 121 to increase in length when the upper fixed block 121 has a length less than that of the sealing part 32 of the pouch 30 at which the electrode lead 20 is disposed.

In the upper extension block coupling process, an upper extension block 124 may be coupled to both ends of the upper fixed block 121 to increase in length of the upper fixed block 121, thereby preparing the upper fixed block 121 to correspond to the sealing part 32 of the pouch 30 at which the electrode lead 20 is disposed.

Sealing Part Seating Step

In the sealing part seating step (S30), the sealing part 32 of the pouch 30 at which the electrode lead 20 is disposed is seated on the top surface of the lower sealing tool 110. As a result, the lower protrusion surface 32a of the sealing part, which protrudes by the electrode lead 20, is supported on the lower fixed block 111, and the lower non-protrusion surface of the sealing part, on which the electrode lead 20 is not provided, is supported on the lower detachable block 112. That is, the entire sealing part 32 of the pouch 30, at which the electrode lead is disposed, may be uniformly supported on the top surface of the lower sealing tool 110.

Sealing Part Sealing Step

In the sealing part sealing step (S40), the upper sealing tool 120 descends toward the lower sealing tool 110 to press and seal the sealing part 32 of the pouch at which the electrode lead 20 seated on the lower sealing tool 110 is disposed. Here, the non-protrusion surfaces 23b and 23d on which the electrode lead 20 is not provided is sealed while being pressed by the lower detachable block 112 and the upper detachable block 122. That is, the protrusion surface of the sealing part is pressed by the lower fixed block and the upper fixed block, and the non-protrusion surface of the sealing part is pressed by the lower detachable block and the upper detachable block. Thus, the entire sealing part 32 of the pouch at which the electrode lead 20 is disposed may be uniformly pressed to increase in sealing force.

[Sealing Device for Secondary Battery According to Third Embodiment of the Present Invention]

Figure 11:
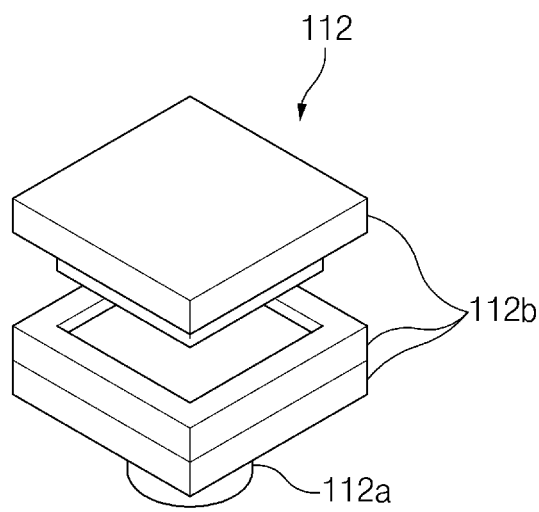
FIG. 11 is a perspective view illustrating a first example of a sealing device for a secondary battery according to a third embodiment of the present invention.
Figure 12:
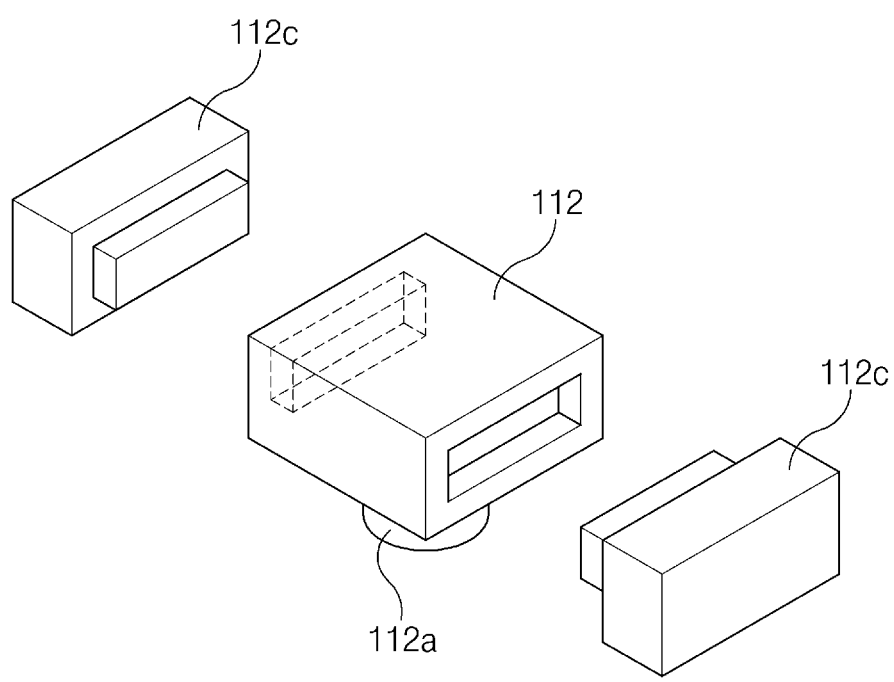
FIG. 12 is a perspective view illustrating a second example of the sealing device for the secondary battery according to the third embodiment of the present invention.

As illustrated in FIGS. 11 and 12, a sealing device for a secondary battery according to a second embodiment of the present invention comprises a lower sealing tool 110. The lower sealing tool 110 comprises a lower fixed block 111 and a lower detachable block 112.

Here, the lower detachable block 112 has a structure having an adjustable thickness and length.

As a first example, as illustrated in FIG. 11, the lower detachable block 112 comprises a plurality of unit blocks 112b that are coupled to be stacked in a vertical direction. Thus, the lower detachable block 112 may be adjusted in height to match a height of the lower protrusion surface 32a of the sealing part 32, which protrudes by the electrode lead.

As a second example, as illustrated in FIG. 12, the lower detachable block 112 comprises a unit block 112c coupled to each of both ends corresponding to each other. Thus, the lower detachable block 112 may be more precisely adjusted in length to match a length of the non-protrusion surface 32b of the sealing part 32 on which the electrode lead is not provided.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A sealing device for a secondary battery, the sealing device configured to seal a sealing part of a pouch through which an electrode lead extends, the sealing device comprising:
   a lower sealing tool configured to receive the sealing part of the pouch seated thereon; and
   an upper sealing tool configured to press and seal the sealing part of the pouch,
   wherein the lower sealing tool comprises:
   a lower fixed block configured to receive the sealing part of the pouch seated on a top surface thereof; and two lower detachable blocks individually detachably coupled to the lower fixed block and individually removable from the lower fixed block and configured to seal a portion of the sealing part through which the electrode lead does not extend, the two lower detachable blocks spaced apart from one another in a longitudinal direction of the lower sealing tool exposing a part of the lower fixed block therebetween, each of the two lower detachable blocks having a planar contact surface facing away from the lower fixed block.

2. The sealing device of claim 1, wherein the lower fixed block has a plurality of first lower coupling parts at the top surface thereof, and each of the lower detachable blocks has a second lower coupling part detachably coupled to a corresponding one of the first lower coupling parts.

3. The sealing device of claim 2, wherein each of the first lower coupling parts is a coupling groove, and each of the second lower coupling parts is a coupling protrusion detachably coupled to a corresponding one of the coupling grooves.

4. The sealing device of claim 2, wherein magnets are provided at each of the first lower coupling parts and at each of the second lower coupling parts so as to be magnetically attached to each other.

5. The sealing device of claim 2, wherein the lower sealing tool further comprises a plurality of fixing pieces configured to fix corresponding ones of the lower detachable blocks to the lower fixed block.

6. The sealing device of claim 5, wherein first and second ends of each of the fixing pieces are respectively supported on the lower fixed block and the corresponding one of the lower detachable blocks, to fix the lower fixed block and the lower detachable blocks to each other.

7. The sealing device of claim 6, wherein one side of each fixing piece has a fixing protrusion rotatably coupled to the lower fixed block, and each fixing piece is rotatable to a first position at which the corresponding one of the lower detachable blocks is supported or a second position at which the corresponding one of the lower detachable blocks is not supported with respect to the fixing protrusion.

8. The sealing device of claim 1, wherein the upper sealing tool comprises:

an upper fixed block configured to press the sealing part of the pouch on a bottom surface thereof; and one or more upper detachable blocks detachably coupled to the upper fixed block and configured to press a portion of the sealing part through which the electrode lead does not extend.

9. The sealing device of claim 8, wherein the upper fixed block has a plurality of first upper coupling parts at the bottom surface thereof, and each of the upper detachable blocks has a second upper coupling part detachably coupled to a corresponding one of the first upper coupling parts.

10. The sealing device of claim 9, wherein each of the first upper coupling parts is a coupling groove, and each of the second upper coupling parts is a coupling protrusion detachably coupled to a corresponding one of the coupling grooves.

11. The sealing device of claim 1, wherein the lower sealing tool further comprises a lower extension block coupled to an end of the lower fixed block, the lower extension block increasing a length of the lower fixed block, and the upper sealing tool further comprises an upper extension block coupled to an end of the upper fixed block, the upper extension block increasing a length of the upper fixed block.

12. The sealing device of claim 1, wherein the part of the lower fixed block is configured to seal a portion of the sealing part of the pouch through which the electrode lead extends, and the two lower detachable blocks and the part of the lower fixed block therebetween together are configured to uniformly press the sealing part of the pouch.

* * * * *